(12) United States Patent
Inui et al.

(10) Patent No.: US 7,587,618 B2
(45) Date of Patent: Sep. 8, 2009

(54) COMPUTER SYSTEM AND UNIT, AND POWER SUPPLY CONTROL METHOD THEREFOR

(75) Inventors: Takashi Inui, Yokohama (JP); Noritoshi Yoshiyama, Yokohama (JP); Seiichi Kawano, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1535 days.

(21) Appl. No.: 10/102,352

(22) Filed: Mar. 20, 2002

(65) Prior Publication Data

US 2002/0152408 A1   Oct. 17, 2002

(30) Foreign Application Priority Data

Apr. 12, 2001   (JP)   ............................. 2001-114642

(51) Int. Cl.
*G06F 1/32*   (2006.01)

(52) U.S. Cl. .................. 713/320; 713/300; 713/324
(58) Field of Classification Search ......... 713/300–375; 710/6, 10
See application file for complete search history.

(56) References Cited

U.S. PATENT DOCUMENTS

| | | | | |
|---|---|---|---|---|
| 5,954,820 A | * | 9/1999 | Hetzler | ....................... 713/323 |
| 6,000,035 A | * | 12/1999 | Matsushima et al. | ........ 713/320 |
| 6,111,657 A | * | 8/2000 | Muto et al. | ................... 358/1.2 |
| 6,119,194 A | * | 9/2000 | Miranda et al. | ............. 710/306 |
| 6,122,748 A | | 9/2000 | Hobson | |
| 6,131,166 A | | 10/2000 | Wong-Insley | |
| 6,567,682 B1 | * | 5/2003 | Osterweil et al. | ........... 600/407 |
| 6,691,233 B1 | * | 2/2004 | Gannage et al. | ............. 713/300 |
| 6,816,976 B2 | * | 11/2004 | Wright et al. | ............... 713/323 |
| 6,826,005 B2 | * | 11/2004 | Hakamata et al. | ............. 360/69 |
| 2001/0003206 A1 | * | 6/2001 | Pole et al. | ................... 713/320 |

\* cited by examiner

*Primary Examiner*—Thomas Lee
*Assistant Examiner*—Paul B Yanchus, III
(74) *Attorney, Agent, or Firm*—Patrick J. Daugherty; Driggs, Hogg, Daugherty & Del Zoppo Co., LPA

(57) ABSTRACT

A computer system apparatus and method therefor are described which are appropriately power-controllable corresponding to each usage-situation. The computer system includes a PC main body and a digitizer wherein the usage-situation of the system is detected. If one of the predetermined usage-situations, such that the digitizer is mainly employed, is adopted, a target power saving mode is determined corresponding to installation or non-installation of an AC adapter, remaining amount of a DC battery, data upload frequency from the digitizer, and other conditions. In addition, in the case that the PC main body is in a power saving mode, the PC main body returns to the normal mode if data upload from the digitizer is requested. After completing the upload, the main body returns to an appropriate power saving mode.

21 Claims, 13 Drawing Sheets

[Figure 1]
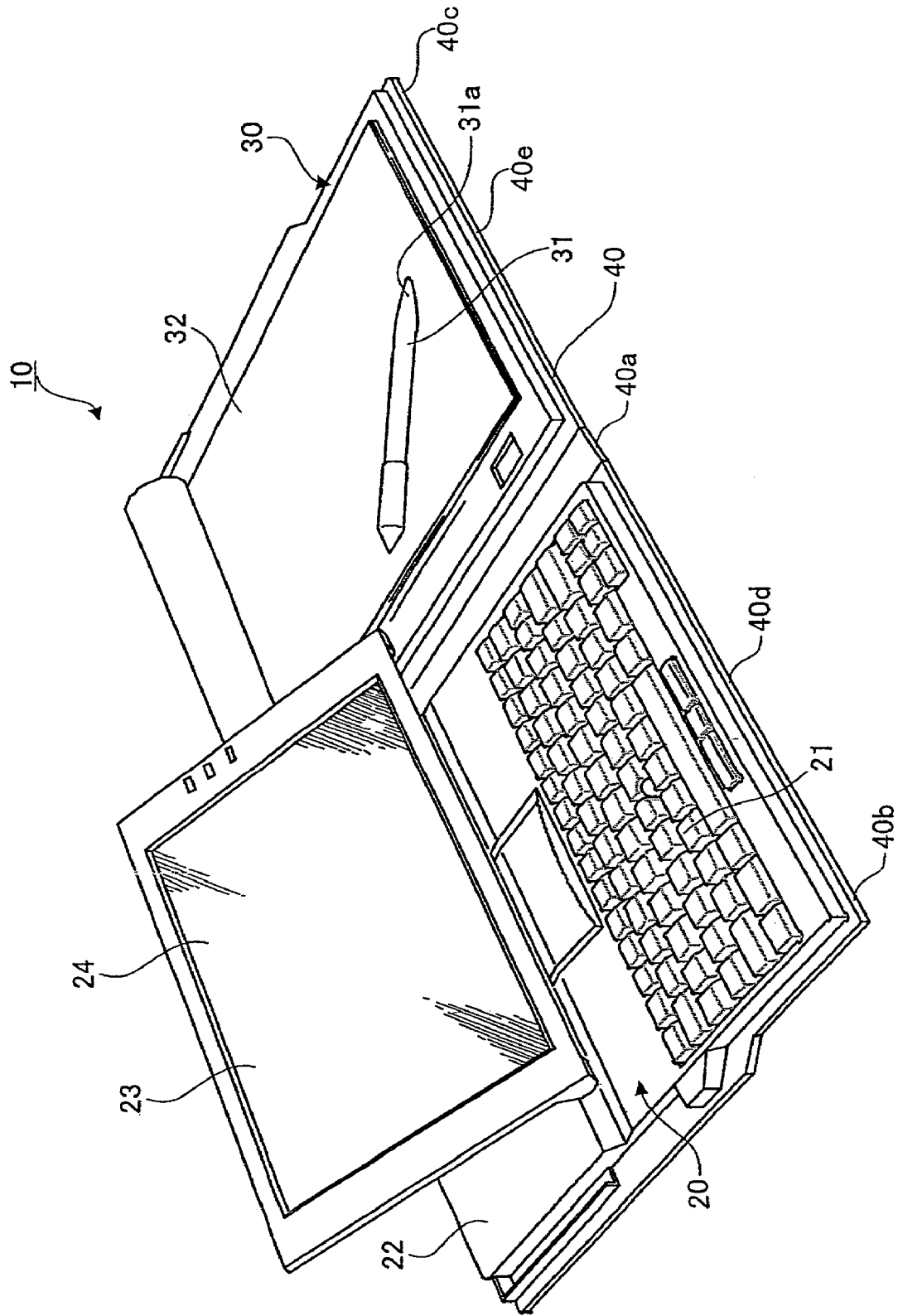

[Figure 2]
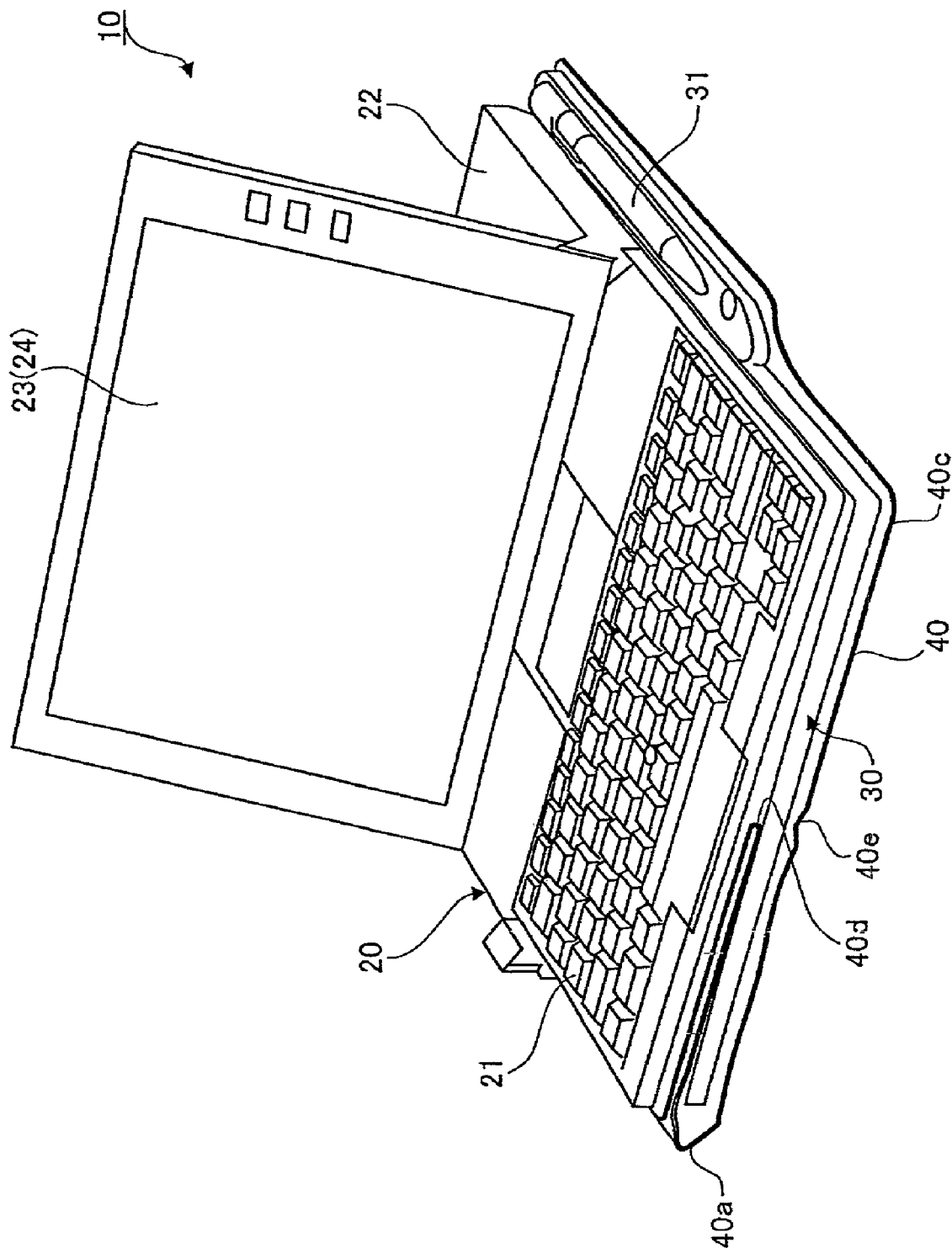

[Figure 3]
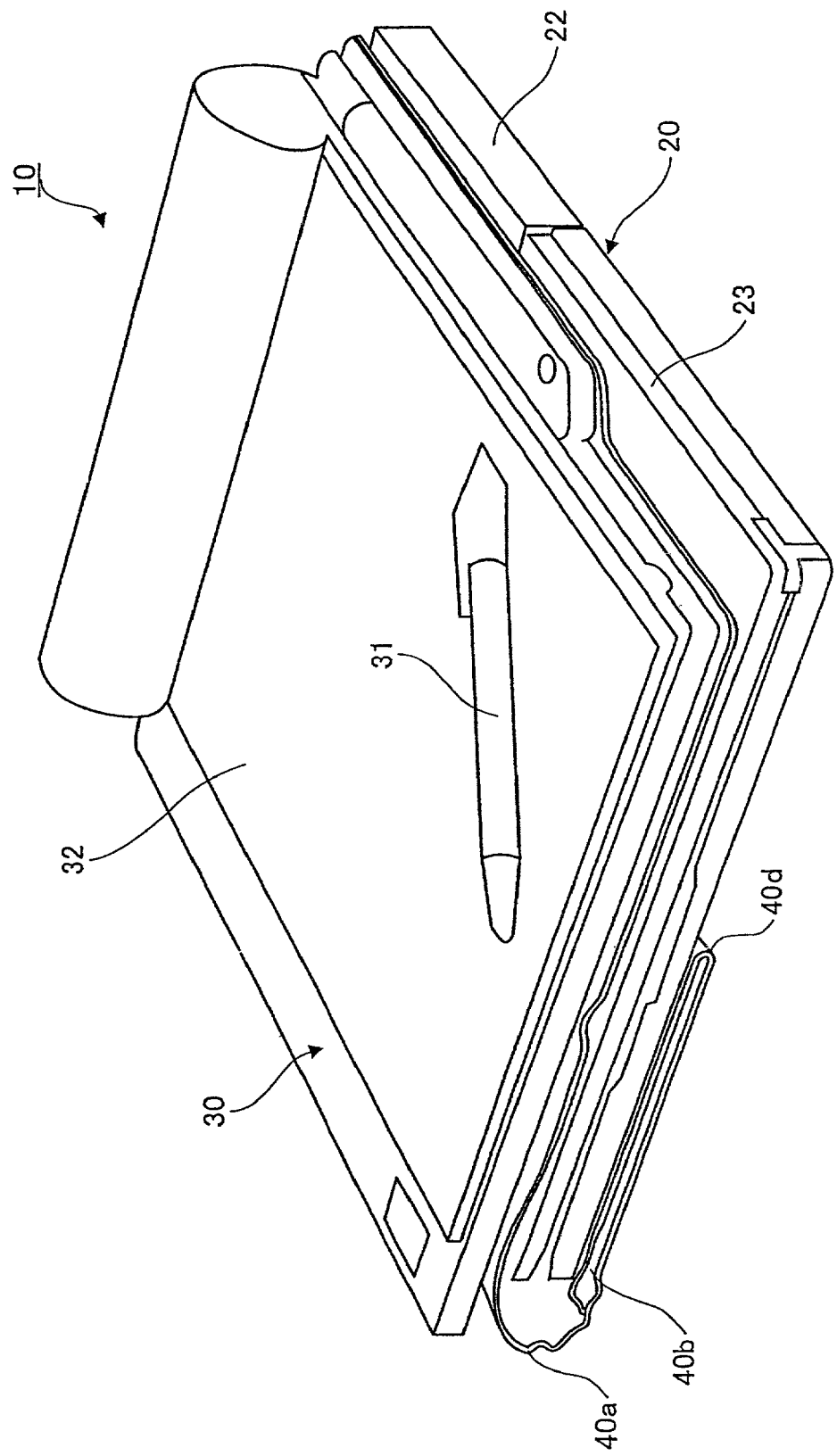

[Figure 4]
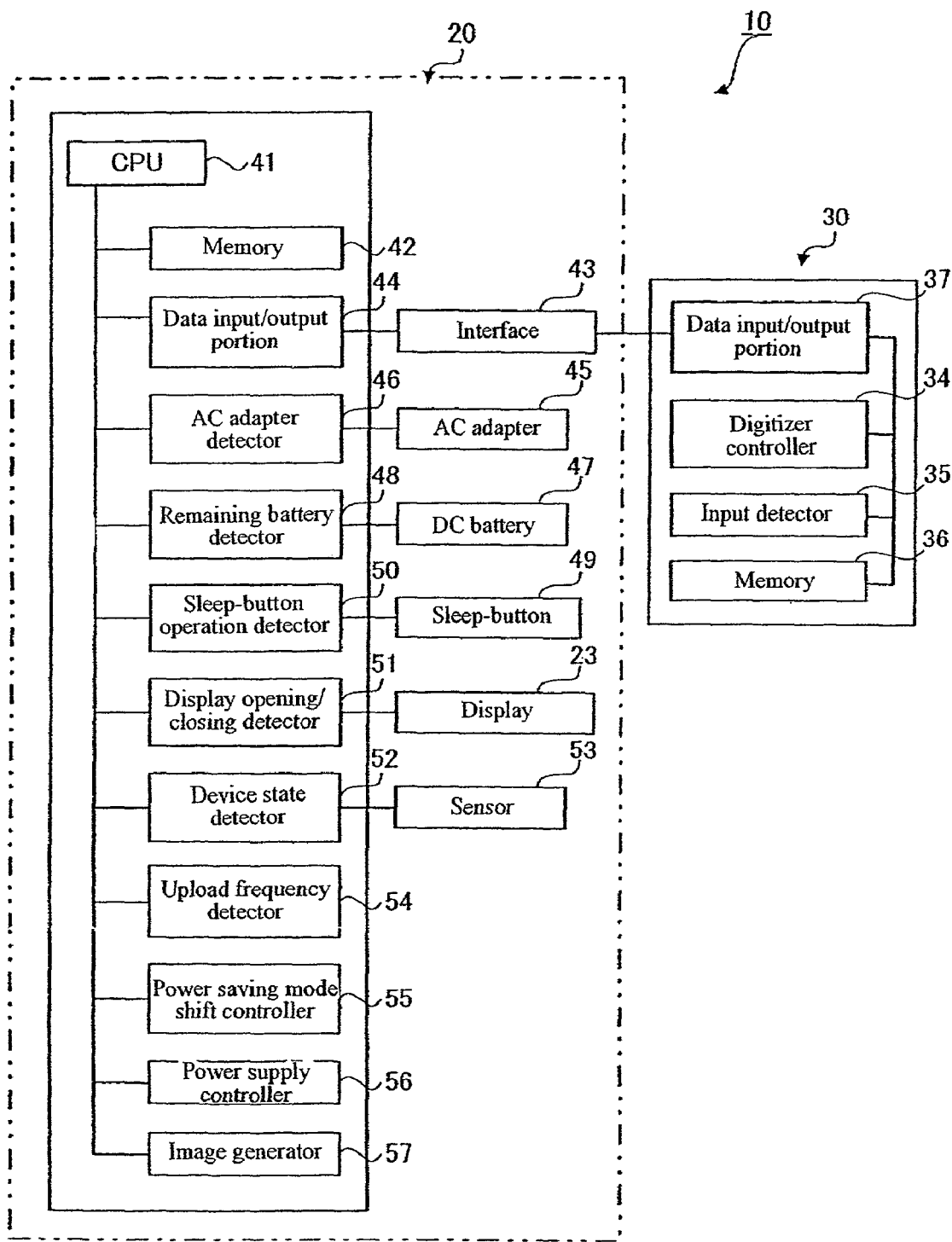

[Figure 5]
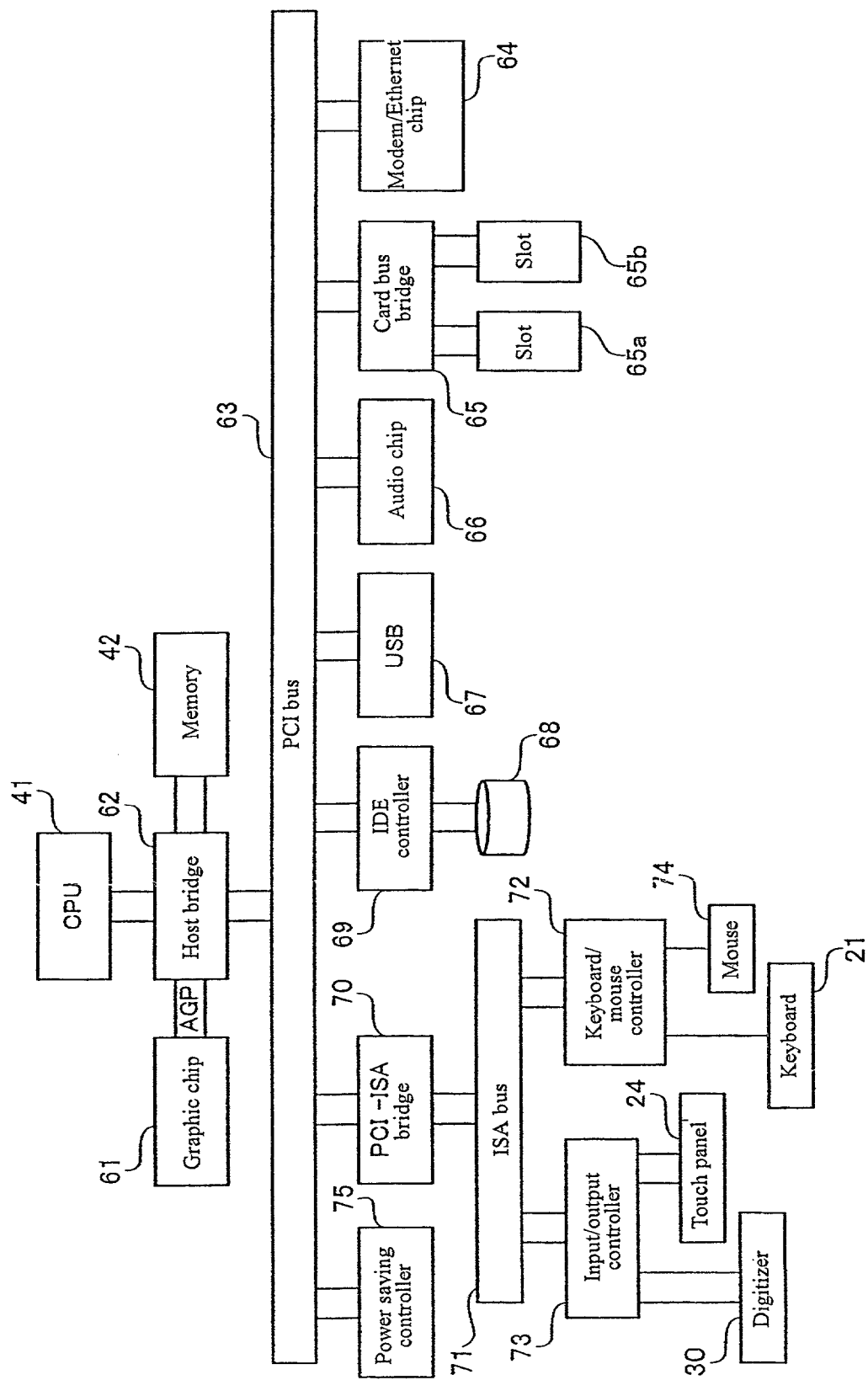

[Figure 6]

| Condition | | | Power saving mode |
|---|---|---|---|
| PC | Data upload | Power state | |
| ON | Frequency: High | Installation of AC adapter or Remaining DC battery: Much | S1 |
| ON | Frequency: Low | Non-installation of AC adapter and Remaining DC battery: Much | S3 |
| ON | Frequency: Low | Non-installation of AC adapter and Remaining DC battery: Little | S4 |
| OFF | — | — | S5 |

[Figure 7]
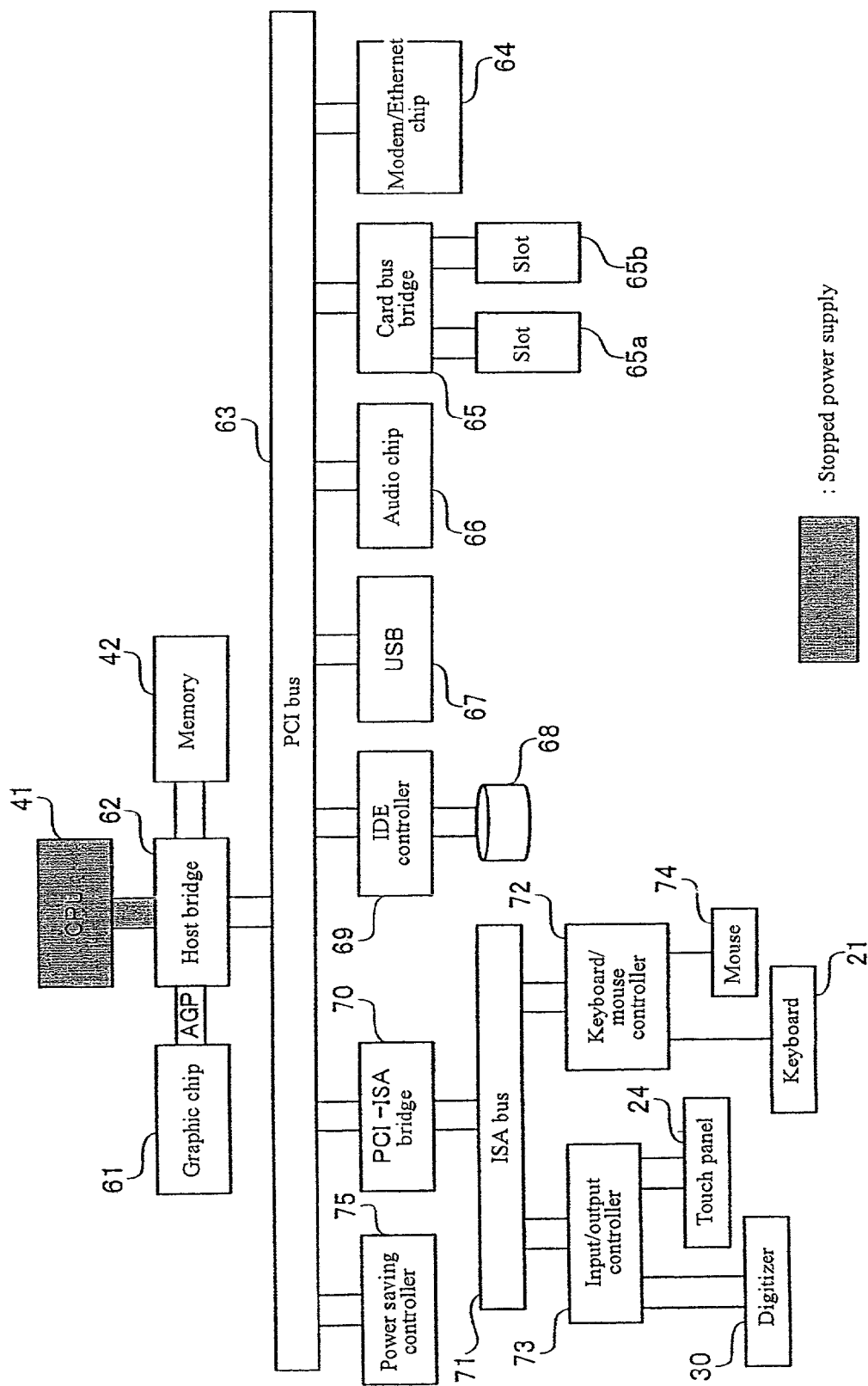

[Figure 8]
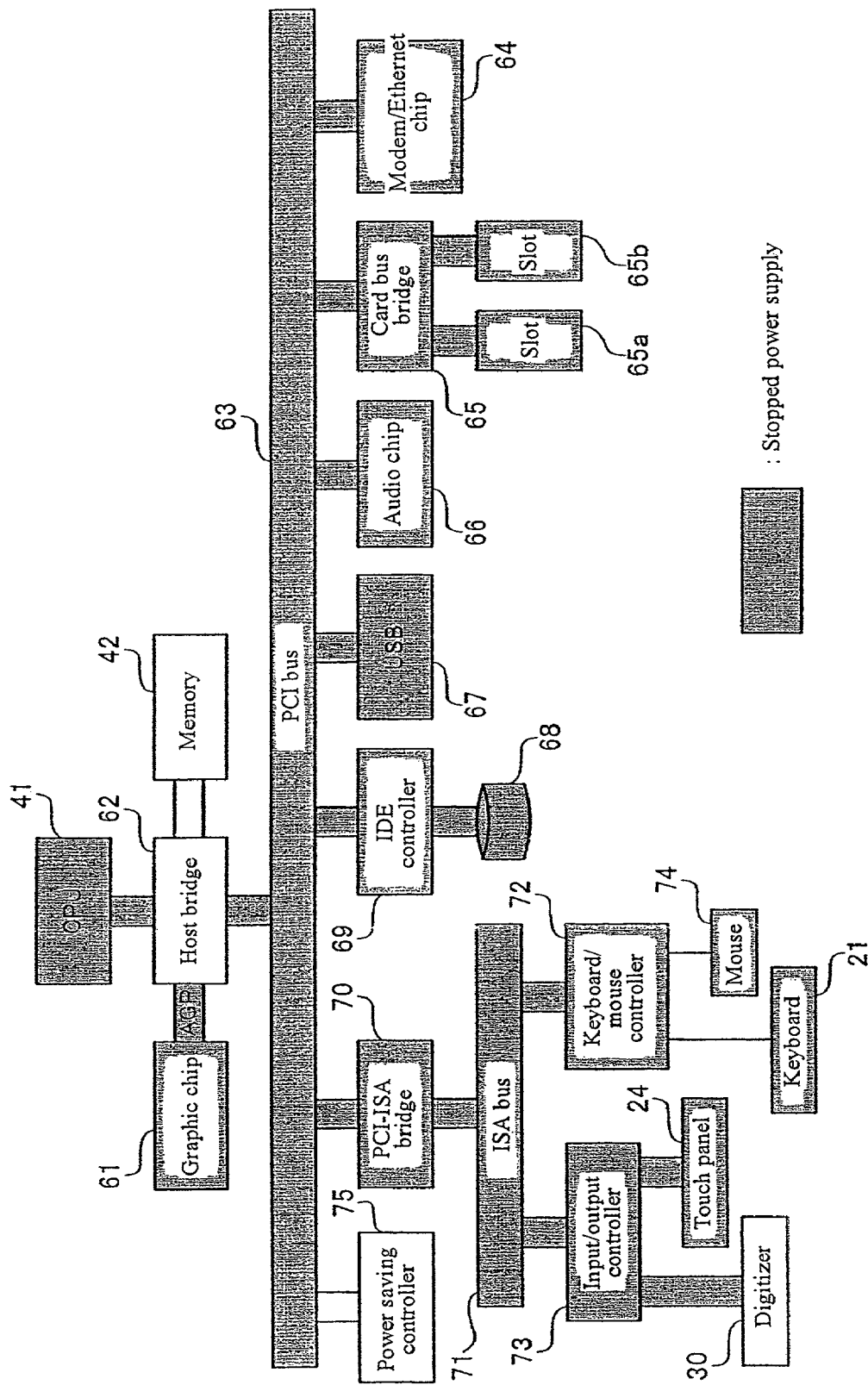

[Figure 9]
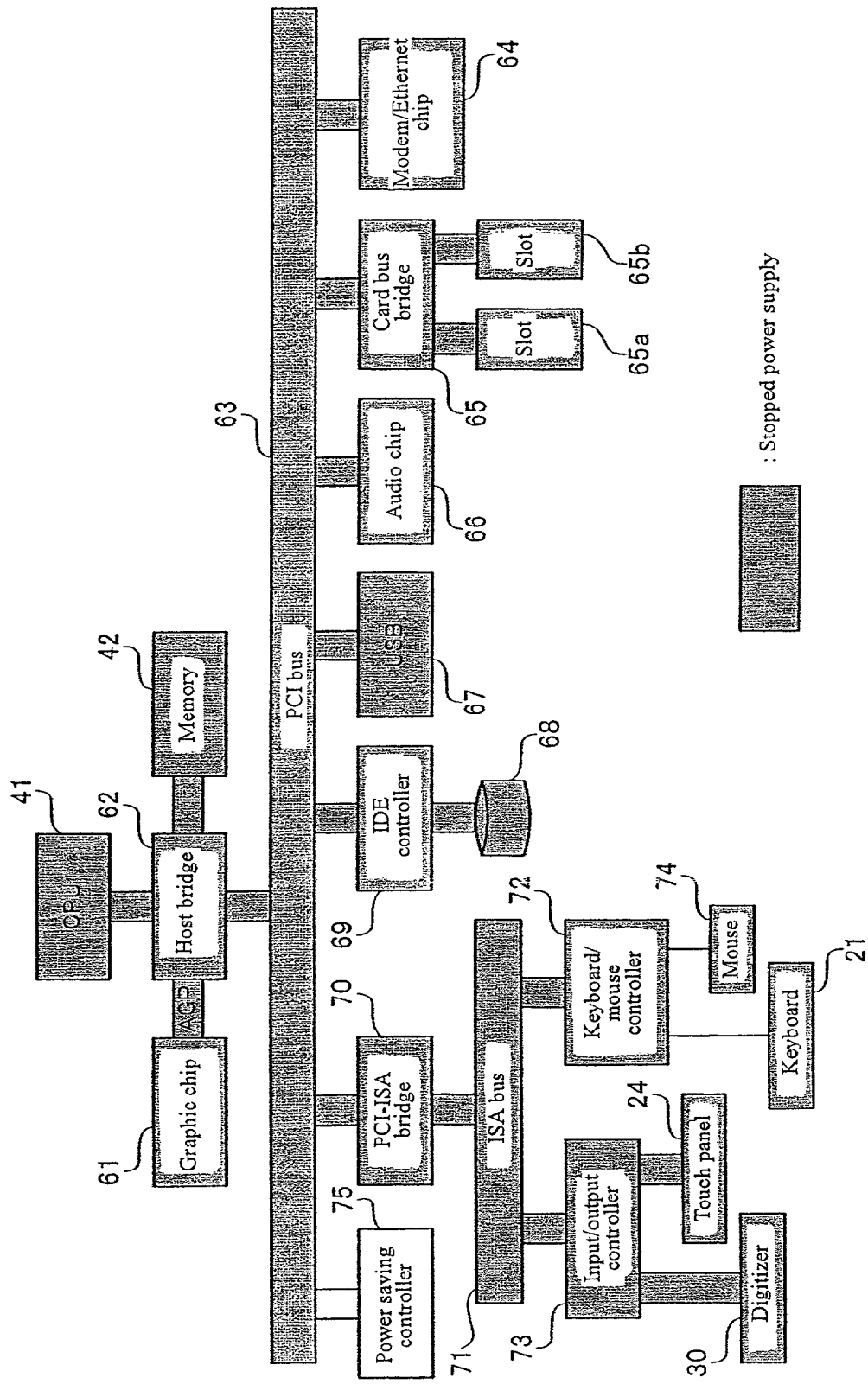

[Figure 10]
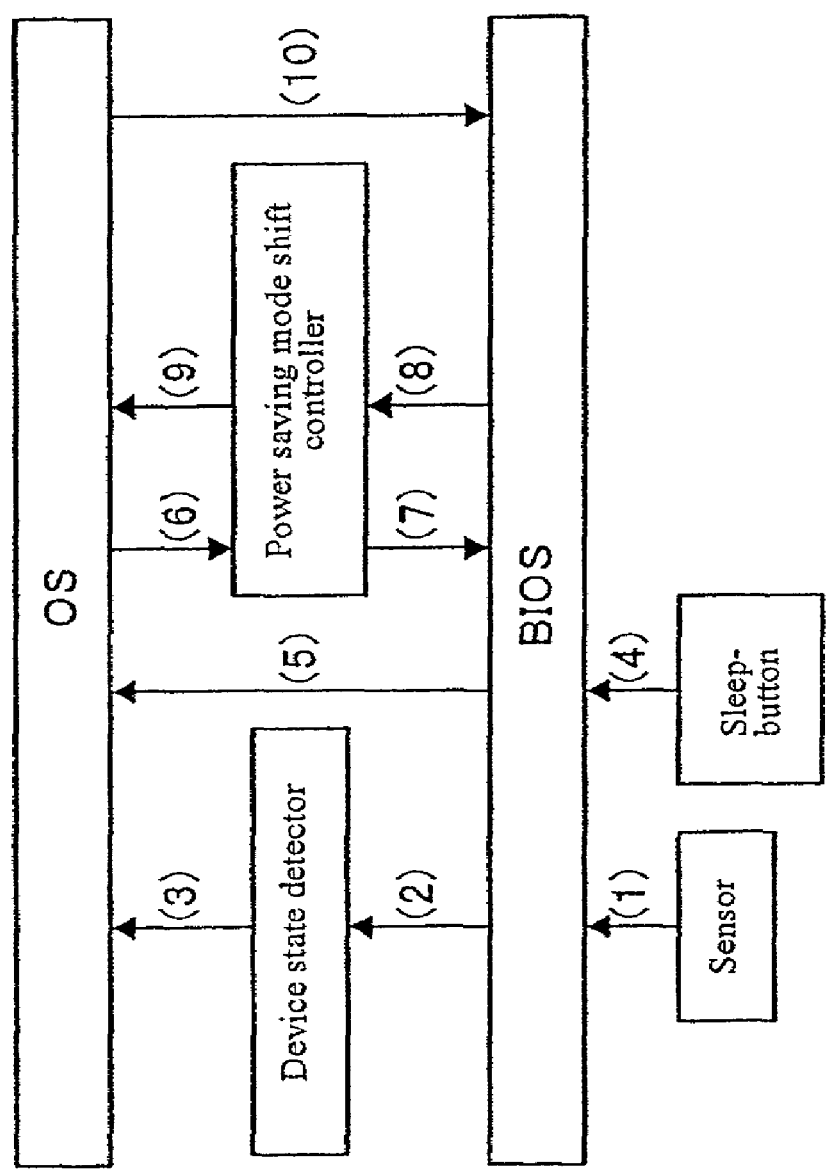

[Figure 11]
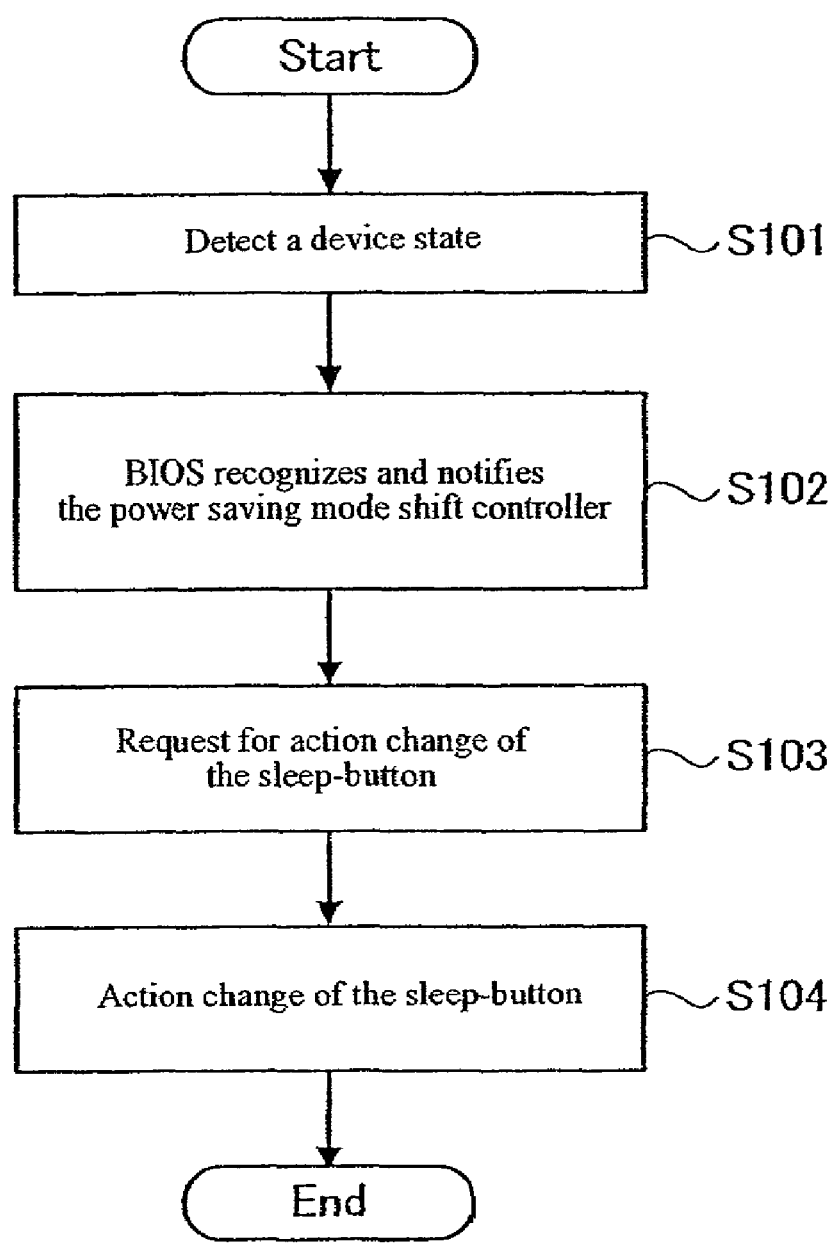

[Figure 12]
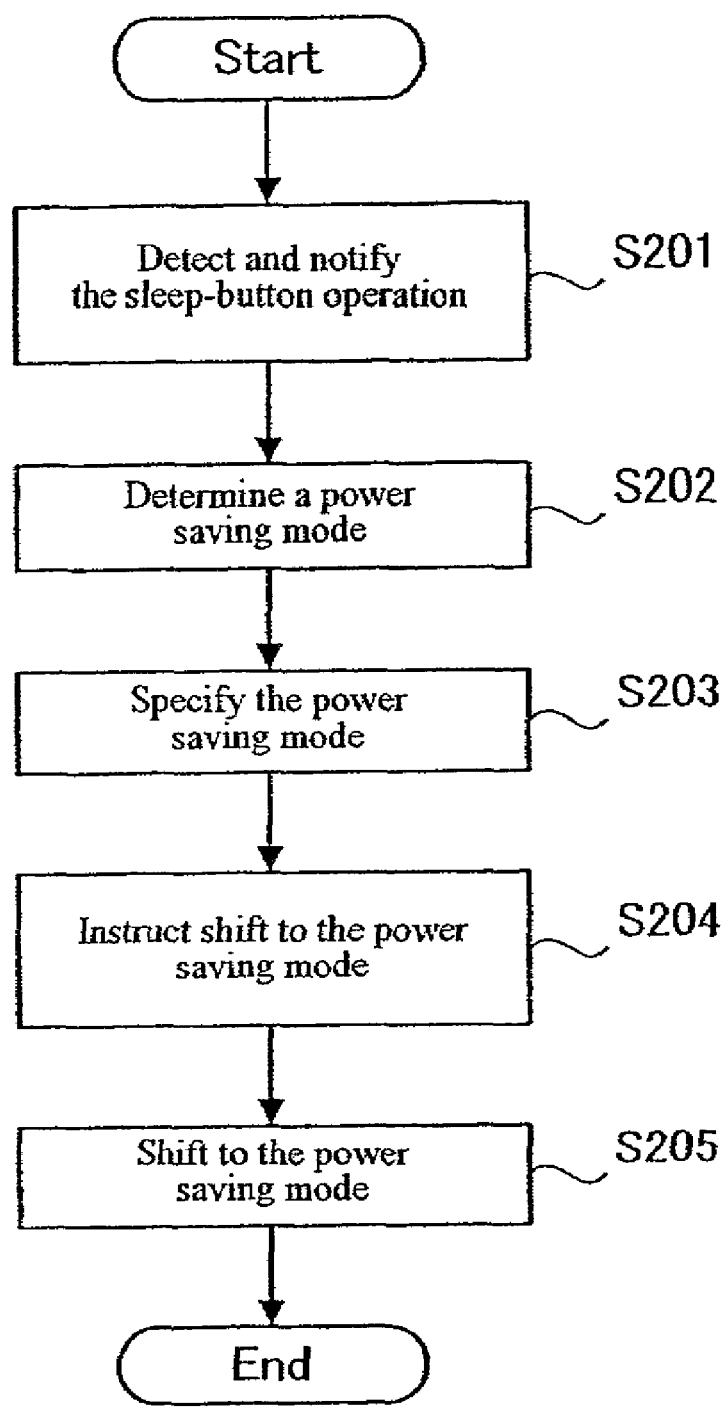

[Figure 13]
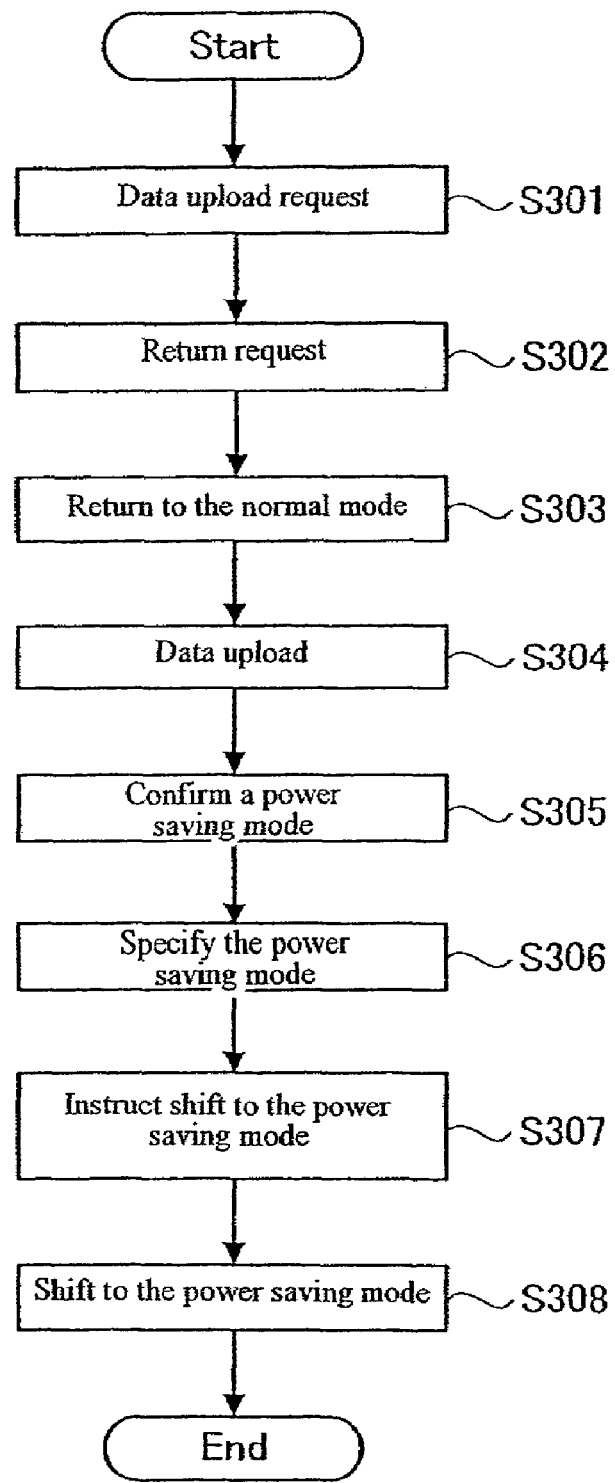

COMPUTER SYSTEM AND UNIT, AND POWER SUPPLY CONTROL METHOD THEREFOR

BACKGROUND OF THE INVENTION

1. Field of the Invention

The present invention relates to a computer system comprising plural devices, a computer apparatus receiving access from an external device, and a power supply control method for the computer apparatus.

2. Description of the Related Art

To reduce power consumption, a computer apparatus, such as a personal computer (PC), can shift to power saving modes for stopping the power supply to each part of PC and including a sleep mode, a hibernation mode, and a shutdown mode while an idle state without input is continued for a predetermined time.

In addition, if a user operates the power or sleep button provided on the PC, the computer can also shift to a power saving mode. Furthermore, a notebook PC, which is foldable between the main body with the keyboard and the display, can shift to a power saving mode by sensing the closing of the display with a sensor or switch.

In a PC events are generated by the operation of trigger devices such as a sensor and a switch, which senses for example the power button, the sleep-button, and the opening or closing of the display. When these events are detected by BIOS (Basic Input/Output System), the BIOS notifies the OS of the generation of these events. Subsequently, the OS instructs a power controller, which controls power supply to each device connected to the PC, to shift to a power saving mode, and then the power controller performs power-control according to a predetermined power saving mode.

In the recently established ACPI (Advanced Configuration and Power Interface), power saving modes are classified into five levels, i.e., S1 to S5. S1 to S3 are stand-by modes, S4 is a hibernation mode, and S5 is a shutdown mode. In this classification, the power saving modes are established such that power consumption decreases gradually from S1 to S5.

All of the five-level power saving modes comprising S1 to S5 are not required to be implemented in a PC. As an example, only S1 and S3 as a stand-by mode can be or are supported. Such power saving modes are established by PC manufacturers who predetermine the correspondence between events occurring in trigger devices, which shift the PC to a power saving mode, and power saving modes.

As described above, in the conventional technique, the OS, notified by BIOS which detects events from trigger devices, supports shifting to each power saving mode.

As is well known in the art, the OS is a highly general-purpose system for adaptation to various PCs. Therefore, once the OS receives a notice, which relates to shifting to a power saving mode, from the BIOS, the OS solely performs the process of shifting to the power saving mode according to the notice.

Recently, PCs are employed in various situations, being combined with an external device, such as a digitizer, a docking station, and PDA (Personal Digital Assistants). In such usage-situations, the conventional method for shifting to power saving modes, which is controlled only inside the PC, may cause the external device not to access the PC due to the state of a power saving mode. Thus, there remain problems in controlling the shift to power saving modes corresponding to various situations.

SUMMARY OF THE INVENTION

It is therefore a purpose to provide a computer system and apparatus, wherein the optimum power control is performed corresponding to usage-situations, and to provide a power supply control method for the computer apparatus.

The computer system according to the present invention comprises a first device to perform a predetermined process and a second device to perform a process different from the process performed in the first device. The computer system is such that the first device is shifted to a power saving mode by a power saving mode shift control means when a power saving mode shift event is detected by usage-situation detecting means and the predetermined conditions to shift to a power saving mode are satisfied (for example, a sleep-button is pushed, or an idle state continues for a predetermined time).

A power saving mode shift event includes: a signal generated by a sensor, which detects the relative position between the first and second devices, a signal that the second device notifies the first device of the second device's situation when the second device is shut down or a predetermined operation mode is selected, and a signal generated after detecting no data transmitted from the second device to the first device for more than a predetermined time.

Furthermore, with operating situation detecting means, the second device's operating situation, such a situation in which the second device operates with the first device, or the second device is mainly used without using the first device or with the first device used only as a data buffer, are detected. Power saving mode selector may select among power saving modes set in plural levels according to the operating situations. In addition, with operating situation detecting means, the predetermined operating situations in the first device, such as installation or non-installation of an AC adapter, which is an operating power source, and a remained amount of a DC battery, are detected. With the power saving mode selecting means, an appropriate power saving mode based on the operating situation may also be selected.

Moreover, with transfer frequency detecting means, data transfer frequency from the second device is detected. Based on the transfer frequency, a suitable power saving mode may be selected among the power saving modes set in plural levels using power saving mode selecting means.

The first device can have a configuration capable of accumulating data transmitted from the second device in a memory and processing the data.

Also, when the first device in a power saving mode receives a data transfer request from the second device, the first device returns to the normal mode. Furthermore, after the first device completes the data transfer corresponding to the data transfer request, the first device may reselect an appropriate power saving mode and then shift to the selected power saving mode.

The computer system according to the present invention comprises a computer apparatus, such as PC, having image display and data input portions, and a digitizer for accepting input line drawing. The digitizer stores the inputted line drawing data into a data storage portion. If a predetermined condition, such a condition in which the amount of stored data exceeds a predetermined quantity, are satisfied, a transferring portion transfers the stored data to the computer apparatus. In the computer apparatus, according to the predetermined parameters indicating an operating situation, such as installation or non-installation of the AC adapter, i.e., operating power source, the remained amount of the DC battery, and the data transfer frequency through the digitizer's data transfer portion, a power supply state is selected in a power supply state selector and power supply to the computer apparatus is controlled in a power supply controller.

In addition, if a usage-situation determining portion determines that the digitizer and the computer apparatus are in a predetermined usage-situation, the power supply controller may also control power supply based on the power supply state selected in the power supply state selector. The predetermined usage-situations include the situation in which the digitizer is mainly employed.

In the present invention, the computer apparatus comprises a processing request receiver which receives a processing request from an external device, a frequency detector which detects the frequency of processing requests from the external device, and a power saving mode selector which selects an appropriate power saving mode according to the detected processing request frequency, and the computer apparatus shifts to the selected power saving mode when satisfying a predetermined condition. Moreover, the power saving mode selector may also select an appropriate power saving mode based on the processing request frequency detected by the frequency detector and the operating situation detected by an operating situation detector.

When the computer apparatus in a power saving mode receives a processing request from an external device, the computer apparatus returns to the normal mode and then performs the process corresponding to the processing request by the external device. Subsequently, after performing of the process, an appropriate power saving mode may be selected and then the computer apparatus shifts to the selected power saving mode.

Processing requests from an external device include the data transfer request to the computer apparatus. In addition, the computer apparatus performs the predetermined processes corresponding to an external device's requests, and then the computer apparatus may output the processing results outward or return them to the external device.

From the viewpoint of a method of power supply control for a computer apparatus, the method comprises: a parameter detecting step of detecting parameters indicating operating situation of the computer apparatus, a frequency detecting step of detecting the frequency of data transfer requests from an external device, a power saving mode determining step of determining an appropriate power saving mode according to the detected parameters and the frequency of data transfer requests, and the power saving mode shift step of shifting to the determined power saving mode when a predetermined event occurs.

Furthermore, with a usage-situation detecting step of detecting the usage-situation between the external device and the computer apparatus, in the case of that a predetermined usage-situation is detected, a power saving mode is determined and then the computer apparatus may shift to the mode. In addition, the method includes a request receiving step of receiving a data transfer request from the external device, a normal mode return step of returning the computer apparatus to the normal mode when the computer apparatus is in a power saving mode, and a data transfer step of transferring data according to a data transfer request. After the data transfer step is competed, the power saving mode determining step and the power saving mode shift step may be executed.

BRIEF DESCRIPTION OF THE DRAWINGS

Some of the purposes of the invention having been stated, others will appear as the description proceeds, when taken in connection with the accompanying drawings, in which:

FIG. 1 illustrates one usage-situation of the computer system in accordance with an embodiment of the present invention;

FIG. 2 illustrates another usage-situation of the computer system;

FIG. 3 illustrates another usage-situation of the computer system;

FIG. 4 illustrates a configuration of the computer system;

FIG. 5 illustrates a device configuration of the computer system;

FIG. 6 illustrates the relationship between operating situations in the PC main body and target power saving modes;

FIG. 7 illustrates the power supply state in the sleep mode S1;

FIG. 8 illustrates the power supply state in the sleep mode S3;

FIG. 9 illustrates the power supply state in the hibernation mode S4 and the shutdown mode S5;

FIG. 10 illustrates an event flow of shift to sleep modes;

FIG. 11 illustrates a flow of changing actions of the sleep-button corresponding to device states;

FIG. 12 illustrates a flow of shift to a power saving mode; and

FIG. 13 illustrates a flow of receiving data upload from the digitizer.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, FIG. 1 shows a configuration of a computer system according to the present embodiment. In FIG. 1, a computer system 10 comprises a PC main body (a first device or a computer apparatus) 20 and a digitizer (a second device or an external device) 30.

The PC main body 20 possesses built-in motherboard and hard disc drive (not shown), a base portion 22 having a keyboard (input portion) 21 for inputting data, and a display (display panel) 23 provided on the base portion 22 in such a manner that it can be opened or closed using an arm (not shown). The display 23 is provided with a pressure-sensible or optical sensor on its entire surface, having a touch panel 24 for receiving input from a user's finger or a pen.

On the other hand, the digitizer 30 receives line drawing input from a digitizer pen 31. The digitizer pen 31 possesses a penpoint 31a with ink to record on paper. At one part of the penpoint 31a, a coil is built in to radiate electromagnetic wave. The electromagnetic wave radiated by the penpoint 31 is detected by the digitizer 30, on the entire surface of which an electromagnetic wave sensor (not shown) is provided. The electromagnetic wave sensor detects position and trace of the penpoint 31a of the digitizer pen 31. On the surface of the digitizer 30, a paper 32 may also be attached, on which line drawing with ink of the digitizer pen 31 is available like a normal pen.

The back surfaces of the PC main body 20 and digitizer 30 are fixed to a cover 40. The cover 40 is foldable at a hinge 40a formed between the PC main body 20 and the digitizer 30.

Furthermore, the cover 40 is fixed at the side of both ends 40b, 40c apart from the hinge 40a and at each center of the lateral directions of the PC main body 20 and the digitizer 30, and foldable at folding portions 40d, 40e, which are the respective centers of the lateral direction of the PC main body 20 and the digitizer 30.

Referring to FIG. 2, in computer system 10 having such a configuration, the cover 40 is folded at the hinge 40a and the folding portion 40d, superposing the back of the PC main body 20 on the surface of the digitizer 30, so that the usage-situation, where the PC main body 20 is placed on the digitizer 30, is available.

Also, as shown in FIG. 3, the cover 40 is folded at the hinge 40a and the folding portion 40d, superposing the back of the digitizer 30 on the surface of the PC main body 20, so that the usage-situation, where the digitizer 30 is placed on the PC main body 20, is available.

The usage-situation illustrated in FIG. 2 is assumed that only the PC main body 20 is employed. The usage-situation illustrated in FIG. 3 is assumed that only the digitizer 30 is employed for line drawing of characters or others.

FIG. 4 shows the configuration of the above-described computer system 10 from a viewpoint of power control.

As shown in FIG. 4, the control block of the PC main body 20 comprises CPU 41 which executes processes according to the predetermined control programs, a memory 42 including RAM (Random Access Memory) which stores processing data, and a data input/output portion 44 (the processing request receiver) which inputs and outputs data via interface 43 connected to the digitizer 30 or an external device. Moreover, an AC adapter detector (the operating situation detecting means, the operating situation detector) 46, which detects installation or non-installation of an AC adapter 45 to the PC main body 20, a remaining battery detector (the operating situation detecting means, the operating situation detector) 48, which detects a remaining amount of the DC battery 47 installed in the PC main body 20, and a sleep-button operation detector 50, which detects the operation of a sleep-button 49 provided on the PC main body 20, are included in the control block.

In the OS, this sleep-button 49 can be assigned to plural operating actions. By switching according to control programs in the PC main body 20, operation of the sleep-button 49 generates sleep mode shift events or execution events for other functions.

In addition, the PC main body 20 is provided with a display opening/closing detector 51 to detect the closed display 23 on the base 22 using a photo-sensor or other detectors (not shown), and a device state detector 52 (usage-situation detecting means, usage-situation determining portion) to detect which usage-situation is adopted for the PC main body 20 among FIGS. 1 to 3.

A device state detector 52 determines the usage-situation of the computer system 10 according to a signal (the power saving mode shift event) obtained by a sensor 53, such as a magnet-type sensor, which detects the superposition of the PC main body 20 and digitizer 30 shown in FIGS. 2, 3, and a detecting result (the power saving mode shift event) obtained by the display opening/closing detector 51.

As one example, if the sensor 53 detects that the back of the PC main body 20 is superposed on the surface of the digitizer 30 and the display opening/closing detector 51 detects the opening state of the display 23, the computer system 10 is in the usage-situation as illustrated in FIG. 2. Also, if the sensor 53 detects that the back of the digitizer 30 is superposed on the surface of the PC main body 20 and the display opening/closing detector 51 detects the closing state of the display 23, the computer system 10 is in the usage-situation as illustrated in FIG. 3. In addition, if the sensor 53 detects that the PC main body 20 and the digitizer 30 are not superposed and the display opening/closing detector 51 detects the opening state of the display 23, the computer system 10 is in the usage-situation as illustrated in FIG. 1.

Moreover, the PC main body 20 is provided with an upload frequency detector (the operating situation detecting means, the transfer frequency detecting means, and the frequency detector) 54 to detect data upload frequency from the digitizer 30.

In the digitizer 30, where a digitizer controller 34 controls according to the predetermined programs, an input detector 35 detects input trace of the digitizer pen 31 using the electromagnetic wave, which is generated by the digitizer pen 31 and then detected by an electromagnetic detecting sensor (not shown). The line drawing data (for example, x, y coordinates, vector and attribute information) based on the input trace detected by the input detector 35 is stored in a memory, such as RAM, (data storage device) 36. At this point, if the amount of data stored in the memory 36 exceeds a predetermined value and the allowable remained value of the memory 36 is below a predetermined value, the digitizer controller 34 requests the PC main body 20 to upload data. Specifically, the digitizer controller 34 transmits a request command to begin data sending. CPU 41 receives the command, and sends the command to allow data transmission to the digitizer 30 in the case that the PC main body 20 can receive the data. When receiving the command, the digitizer 30 transfers (uploads) the data stored in the memory 36 to a memory 42 in the PC main body 20 via a data input/output portion (data transfer portion) 37 and data input/output portion 44 of the PC main body 20. An upload frequency detector 54 detects the number of transfer per unit time or upload frequency from the digitizer 30 to the PC main body 20.

The line drawing data stored in the memory 42 of the PC main body 20 is transformed into image data by an image generator 57 provided in the PC main body 20, and then transmitted to the display 23 to display as an image.

Furthermore, the PC main body 20 possesses a power saving mode shift controller (power saving mode shift control means, power saving mode selecting means, a power supply state selector, and the power saving mode selector) 55 and a power supply controller 56.

As will be described below, the power saving mode shift controller 55 controls shift from the normal mode to a power saving mode if an idle state continues for a predetermined time or a predetermined power saving mode shift event is detected. A predetermined power saving mode shift event is generated when the sleep-button operation detector 50 detects that the sleep-button 49 is operated. In this embodiment, the power saving mode shift controller 55 controls shift to power saving modes including sleep modes S1, S3, hibernation mode S4, and shut-down mode S5.

Also, the power supply controller 56, which is a part of BIOS, controls power supply to each device in the PC main body 20 corresponding to each power saving mode according to the control of the power saving mode shift controller 55.

FIG. 5 illustrates a device configuration of the computer system 10. In the PC main body 20, the CPU 41, the memory 42, and a graphic chip 61, which controls images displayed in the display 23, are connected with a PCI (Peripheral Component Interconnect) bus 63 through a host bridge 62. To the PCI bus 63, a modem/Ethernet chip 64, which controls communications to a network, such as the Internet and LAN (Local Area Network), a card bus bridge 65 with a PC card insert slot 65a, 65b, a voice control audio chip 66, USB (Universal Serial Bus) 67, which is an interface connecting an external device, an IDE controller 69, which controls data input/output to a hard disc drive 68, and a PCI-ISA bridge 70 are connected. A keyboard/mouse controller 72 and an input/output controller 73 are connected to the ISA bus 71 connected to the PCI-ISA bridge 70.

A keyboard/mouse controller 72 receives input from a keyboard 21 and an exterior type mouse 74, which are coupled with the PC main body 20, and outputs events according to the input toward the CPU 41.

In addition, an input/output controller 73 receives the input from a touch panel 24 on the display 23 and the digitizer 30, and outputs events according to the input toward the CPU 41.

Furthermore, the PCI bus 63 is provided with a power saving controller 75, which controls power supply to the entire computer system 10 when shifting to a power saving mode.

Hereinafter, a power control method of the computer system 10 configured as described above will be described.

In the usage-situations shown in FIGS. 1, 2, and the usage-situation shown in FIG. 3 not in a power saving mode, the power supply controller 56 supplies power to all of the devices in the computer system 10 illustrated in FIG. 5 (the normal mode).

In this embodiment, in the case of that the device state detector 52 detects the situation of the computer system 10 illustrated in FIG. 3, where the digitizer 30 is superposed on the PC main body 20, only the digitizer 30 is assumed to be employed. Therefore, the following power control will be performed.

When the situation shown in FIG. 3 is adopted, and an idle sate continues for a predetermined time or the sleep-button operation detector 50 detects that the sleep-button 49 is operated, the power saving mode shift controller 55 selects a power saving mode among the sleep modes S1, S3, the hibernation mode S4 and the shut-down mode S5 according to the predetermined conditions. The predetermined conditions are operating situation of the PC main body 20, and parameters indicating the operating situation include ON/OFF of the PC main body 20, data upload frequency from the digitizer 30 to the PC main body 20, which is detected by the upload frequency detector 54, installation or non-installation (power situation) of the AC adapter 45, which is detected by the AC adapter detector 46, and the remaining amount of battery (power situation) in the DC battery 47, which is detected by the remaining battery detector 48.

FIG. 6 shows a table of shift destinations of power saving mode according to the conditions. The power saving mode shift controller 55 selects a power saving mode according to the predetermined control programs and this table, and then the power saving controller 75 notifies the power supply controller 56 of a predetermined command according to the selected power saving mode. As a result, the power supply state corresponding to the selected power saving mode is acquired.

For example, in the case of that the PC main body 20 is operating (ON), data upload frequency from the digitizer 30 to the PC main body 20 exceeds a predetermined threshold value, and the AC adapter 45 is placed or the remaining amount of the DC battery 47 exceeds a predetermined threshold value, the power saving mode shift controller 55 selects shift to the sleep mode 1.

FIG. 7 shows a power supply state to each device in the computer system 10, which is executed by the power supply controller 56 according to an instruction of the power saving controller 75 in the sleep mode 1 selected in the power saving mode shift controller 55. As illustrated in FIG. 7, in the sleep mode 1, only the power supply to the CPU 41 is stopped, and the normal power supply is performed to all of the other devices or they are set in a predetermined low power consuming state.

Also, referring to FIG. 6, in the case of that the PC main body 20 is operating (ON), the data upload frequency from the digitizer 30 to the PC main body 20 is below a predetermined threshold value, and the AC adapter 45 is not placed and the remaining amount of the DC battery 47 exceeds a predetermined threshold, the power saving mode shift controller 55 selects shift to the sleep mode S3.

FIG. 8 shows a power supply state to each device in the computer system 10, which is executed by the power supply controller 56 according to an instruction of the power saving controller 75 in the sleep mode 3 selected in the power saving mode shift controller 55. As illustrated in FIG. 8, in the sleep mode S3, the normal power supply is performed on only the memory 42 which receives data upload from the memory 36 of the digitizer 30 and the host bridge 62, or they are set in a predetermined low power consuming state, and power supply to all of the other devices including the CPU41 is stopped, being in OFF-state.

In addition, referring to FIG. 6, in the case of that the PC main body 20 is operating (ON), data upload frequency from the digitizer 30 to the PC main body 20 is below a predetermined threshold value, and the AC adapter 45 is not placed and the remaining amount of the DC battery 47 is below a predetermined threshold value, the power saving mode shift controller 55 selects shift to the hibernation mode S4. When the remaining amount of DC battery 47 is below the predetermined threshold value, the power saving mode shift controller 55 selects shift to the hibernation mode S4 even if data upload frequency exceeds a predetermined threshold value.

FIG. 9 shows a power supply state to each device in the computer system 10, which is executed by the power supply controller 56 according to an instruction of the power saving controller 75 in the hibernation mode 4 selected in the power saving mode shift controller 55. As illustrated in FIG. 9, in the hibernation mode S4, power supply to all of the devices in the computer system 10 is stopped, being in OFF-state. Moreover, in this hibernation mode S4, the data stored in the memory 42 and commands to maintain operating states will be contained in the hard disc drive 68 immediately before shifting to the hibernation mode S4.

Furthermore, in the usage-situation illustrated in FIG. 3, if the PC main body 20 is in OFF-state, and the AC adapter 45 is not placed and the remaining amount of the DC battery 47 is below a predetermined threshold value, the power saving mode shift controller 55 selects shift to the shutdown mode S5. In the shutdown mode S5, power supply to all of the devices in the computer system 10 is stopped, being in OFF-state.

Hereinafter, a process flow in the computer system 10 for shift to the above-described sleep modes S1, S3, hibernation mode S4, and shutdown mode S5 will be explained. FIG. 10 illustrates an event flow generated with shift to power saving modes, and FIGS. 11 to 13 illustrate process flows.

As shown in FIG. 11, the sensor 53 detects that usage-situation of the computer system 10 is one illustrated in FIG. 3, i.e., the situation where the digitizer 30 is superposed on the PC main body 20 ((1) in FIG. 10, step S101: usage-situation detecting step), and then the BIOS of the PC main body 20 recognizes this and notifies the device state detector 52 of this ((2) in FIG. 10, step S102).

The device state detector 52 receiving the notice judges that the computer system 10 is in the situation shown in FIG. 3, where the digitizer 30 is superposed on the PC main body

20, and then requests action change of the sleep-button 49 to the OS (((3) in FIG. 10, step S103).

Upon receiving the change request, the OS changes the action of the sleep-button 49 into the shift request to a sleep mode such that the event to shift to a sleep mode is outputted (step S104).

As shown in FIG. 12, if the sleep-button 49 is pushed by a user, the BIOS functions as the sleep-button operation detector 50 and detects the operated sleep-button 49 ((4) in FIG. 10), notifying the OS that the sleep-button 49 is pushed ((5) in FIG. 10, step S201).

Upon receiving this notice, the OS questions the power saving mode shift controller 55 about an appropriate power saving mode ((6) in FIG. 10). Subsequently, the power saving mode shift controller 55 questions the BIOS, which functions as the AC adapter detector 46, the remaining battery detector 48, the display opening/closing detector 51, and the upload frequency detector 54, about a detected result ((7) in FIG. 10). According to the detected result from the BIOS ((8) in FIG. 10) and the table shown in FIG. 6, an appropriate power saving mode, for example, the sleep mode S1, is determined (step 202: the parameter detecting step, the frequency detecting step, and the power saving mode determining step).

At this point, as the shift destination of power saving mode, the power saving mode shift controller 55 specifies the determined power saving mode, i.e., the sleep mode S1, to the OS ((9) in FIG. 10, step S203).

Upon receiving the power saving mode, the OS orders the BIOS, which functions as the power supply controller 56, to shift to the power saving mode, i.e., sleep mode S1 ((10) in FIG. 10), step S204), and then the BIOS supplies power to each device in the power supply state (cf. FIG. 7) corresponding to the sleep mode S1 (step S205: the power saving mode shift step).

Furthermore, in the case of that the power saving mode shift controller 55 selects shift to the sleep mode S3, the sleep mode S3 may be determined as an appropriate power saving mode in the step S202.

In addition, in the case of that shift to the hibernation mode S4 or the shutdown mode S5 is performed, the actions resulting from operating of the sleep button 49 in the steps S103 to S104 may be changed into the shift request to the hibernation mode S4 or the shutdown mode S5.

Hereinafter, a process flow, in which the PC main body 20 is in a power saving mode, such as the sleep modes S1, S3, the hibernation mode S4, and the shut down mode S5, and data upload is requested from the digitizer 30, will be explained.

As shown in FIG. 13, when the data input/output portion 44 of the PC main body 20 receives a data upload request from the data input/output portion 37 of the digitizer 30 (step S301: the request receiving step), the data input/output portion 44 notifies the BIOS of this, and then the BIOS requests the OS to return from a power saving mode to the normal mode (step S302).

Upon receiving the request, the OS orders the BIOS (the power supply controller 56) to return to the normal mode as shown in FIG. 5, and then the BIOS supplies power to all of the devices in the computer system 10, resulting that the computer system 10 returns to the normal mode (step S303: the normal mode return step).

Then, the data input/output portion 44 of the PC main body 20 stores upload data from the data input/output portion 37 of the digitizer 30 in the memory 42 (step S304: the data transfer step).

After completing the data upload, the OS confirms an appropriate power saving mode to the power saving mode shift controller 55 (step S305). Subsequently, the power saving mode shift controller 55 determines an appropriate power saving mode, for example, the sleep mode S1, according to the output results from the AC adapter detector 46, the remaining battery detector 48, the display opening/closing detector 51, and the upload frequency detector 54, and then notifies the OS of the power saving mode (step S306: the power saving mode determining step).

Upon receiving this, the OS orders the BIOS (the power supply controller 56) to shift to the power saving mode, i.e., the sleep mode S1 (step S307), and then the BIOS supplies power to each device in the power supply state (cf. FIG. 5) corresponding to the sleep mode S1. As a result, the PC main body 20 shifts to a predetermined power saving mode (step S308: the power saving mode shift step).

In the above-described computer system 10, a target power saving mode is determined among the sleep modes S1, S3, the hibernation mode S4, and the shutdown mode S5 according to the predetermined conditions detected by the AC adapter detector 46, the remaining battery detector 48, and the upload frequency detector 54. In this way, shift control to the most appropriate power saving mode can be performed corresponding to installation or non-installation of the AC adapter 45, the remaining amount of the DC battery 47, and the data upload frequency from the digitizer 30.

Especially, in the computer system 10 comprising the above-described PC main body 20 and digitizer 30, the device state detector 52 detects the usage-situation of the computer system 10. If the usage-situation (the state shown in FIG. 3), in which the digitizer 30 is mainly employed, is adopted, the sleep mode S1, in which the return time to the normal mode is short, is selected in the case of high data upload frequency from the digitizer 30, or a more effective power saving mode, such as the sleep mode S3 and the hibernation mode S4, is selected in the case of low data upload frequency from the digitizer 30. With this mode selection, the PC main body 20 can be shifted to the most appropriate power saving mode corresponding to usage-situation such that the digitizer 30 is employed as shown in FIG. 3.

In addition, if the PC main body 20 is in the sleep modes S1, S3, or the hibernation mode S4, and a data upload request from the digitizer 30 has occurred, the PC main body 20 can return to the normal mode and then receive the data upload. After completing the upload, the PC main body returns to a power saving mode again, so that the power saving effect can be maintained.

Furthermore, if the AC adapter 45 is not connected and the remaining amount of the DC battery 47 is small, the hibernation mode S4 is selected independent of data upload frequency from the digitizer 30. This enables the computer system 10 to extend the continuous usable time.

In the above-described embodiment, a power saving mode is selected in the usage-situation of the computer system 10 shown in FIG. 3. However, usage-situations are not limited, and a target power saving mode can be suitably controlled in other usage-situations, such as ones shown in FIGS. 1, 2, by setting appropriate conditions.

In addition, in the above-described embodiment, the computer system 10 comprises the PC main body 20 and the digitizer 30. However, the system configuration is not limited thereto, and the computer system 10 may comprise the PC main body 20 and an external device, which sends or receives data to or from the PC main body 20 and functions alone, such as PDA (Personal Digital Assistants) and a docking station.

Also, in the above-described embodiment, the PC main body 20 and the digitizer 30 are attached to the cover 40. However, the device configuration is not limited thereto, and they may be simply connected using a data transfer cable or radio communication means such as Bluetooth, or may be connected via a network, such as the Internet and LAN.

Furthermore, in the above-described embodiment, the configuration, in which one of the power saving modes including the sleep modes S1, S3, the hibernation mode S4, and the shutdown mode S5 is available, is adopted. However, the number and types of available modes may be properly set. Also, criteria for determining a power saving mode is not limited to the conditions shown in FIG. 6, and may be changed or replaced with other items.

In addition, to detect the state of the computer system 10, the display opening/closing detector 51 comprising a photosensor and the sensor 53 are employed, but other sensors and switches may also be available.

The programs to execute the processes in the above-described embodiment may be stored and transmitted using the following storage devices and program transmitting devices.

In storage devices, CD-ROM, DVD, memory, and hard disc are available, and the programs are stored such that the computer system can read them.

A program transmitting device comprises storage means which stores the above mentioned programs, such as CD-ROM, DVD, memory, and hard disc, and transmitting means, which transmits the programs via a connector or a network, such as the Internet and LAN, to the device executing them. Especially, such a program transmitting device is suitable in the case of that the programs for the above-described processes are installed in PC or other devices.

In the description supra, the phrase "usage-situation" is employed to describe the different usage modes and configurations as set forth in the accompanying drawings and in the specification.

In the drawings and specifications there has been set forth a preferred embodiment of the invention and, although specific terms are used, the description thus given uses terminology in a generic and descriptive sense only and not for purposes of limitation.

What is claimed is:

1. A method, comprising:
   detecting parameters indicating an extant operating-situation of a computer system which is executing an operating system program;
   ascertaining the frequency of data transfer requests provided by an external device which is separate from, coupled to said computer system, and executing processes distinct from the operating system program;
   determining an appropriate power saving mode for the computer system according to the detected parameters and the frequency of data transfer requests for the external device; and
   shifting the computer system to the determined power saving mode based upon the detected parameters and the ascertained frequency.

2. The method of claim 1, further comprising:
   detecting the usage-situation of the external device and the computer system;
   wherein when the external device and the computer system are detected as being in a predetermined usage-situation, the steps of determining and shifting are executed.

3. The method of claim 1, further comprising:
   receiving data transfer requests from the external device;
   returning the computer system to the normal mode when the computer system is in a power saving mode; and
   performing data transfer processes according to the data transfer requests;
   wherein after the transfer of data is completed, the steps of determining and shifting are executed.

4. The method of claim 1, wherein the external device is a digitizer, and ascertaining a frequency of data transfer requests includes detecting the frequency of data uploads from the digitizer.

5. The method of claim 4, wherein the digitizer stores data in a local memory of the digitizer and requests to upload data to the computer system when an amount of data stored in the local memory of the digitizer exceeds a predetermined value.

6. The method of claim 1, further including shifting the computer system to a first power saving mode when the frequency of the data transfer requests is within a first range, and shifting the computer system to a second power saving mode when the frequency of the data transfer requests is within a second range, wherein the first range is higher than the second range, and the first power saving mode supplies more power to the computer system than the second power saving mode.

7. The method of claim 6, further including shifting the computer system to the second power saving mode when both the frequency of the data transfer requests is within the second range and an internal power supply of the computer system has a first charge, and shifting the computer system to a third power saving mode when both the frequency of data transfer requests is within the second range and the internal power supply of the computer system has a second charge, wherein the first charge is greater than the second charge.

8. The method of claim 1, wherein the computer system and the external device wirelessly communicate over a wireless communication connection therebetween.

9. Apparatus comprising:
   a computer system performing general computation processes;
   an operating system program stored accessibly to and executing on said computer system and supporting the general computational processes;
   an external device performing specialized computation processes, coupled to said computer system, and selectively exchanging data with said computer system, wherein the external device stores data in a local memory of the external device and requests to upload data to the computer system only when an amount of data stored in the local memory of the external device exceeds a predetermined value;
   a usage situation detector within said computer system monitoring the operational state of said computer system including data exchange between said computer system and said external device; and
   a power shift controller within said computer system coupled to said usage situation detector and said operating system program and responding to the monitored operational state of said computer system by shifting said computer system among power saving modes.

10. The apparatus according to claim 9 further including:
    an operating situation detector within said external device detecting a predetermined operating situation in said external device; and
    a power saving mode selector selecting for said computer system a target power saving mode from amongst a plurality of present power saving modes in response to detection by said operating situation detector of the predetermined operating situation in said external device;
    said power shift controller shifting said computer system from a normal mode to the target power saving mode upon detection of the predetermined operating situation in said external device.

11. The apparatus according to claim 9 comprising:
a transfer frequency detector which detects a transfer frequency corresponding to incidents of data transfer between said computer system and said external device; and
a power saving mode selector selecting for said computer system a target power saving mode from amongst a plurality of preset power saving modes according to said transfer frequency as detected by said transfer frequency detector,
said power shift controller shifting said computer system from a normal mode to the target power saving mode upon detection of the transfer frequency.

12. The apparatus according to claim 9 wherein said computer system, when operation in a power saving mode, responds to a data transfer request from said external device by returning to the normal mode.

13. The apparatus according to claim 12 wherein after said computer system completes a data transfer corresponding to a data transfer request, said power saving mode selector selects an appropriate power saving mode, and said power shift controller said computer system to the appropriate power saving mode as selected by said power saving mode selector.

14. The apparatus according to claim 9 wherein
said computer system has an image display panel, a data input portion, and a power supply state selector which selects a power supply state for said computer system according to a predetermined parameter indicating an operating situation of said computer system;
said external device comprises a digitizer which sketch data corresponding to drawing input provided thereon and has data storage in which digitized sketch data is stored and a data transfer portion which transfers the digitized sketch data to said computer system when a predetermined condition is satisfied; and further comprising
said computer system has a power supply controller which controls power for said computer system according to the power supply state as selected by the power supply state selector.

15. The apparatus according to claim 9, wherein the external device requests to upload data to the computer system over a wireless communication connection therebetween.

16. The method of claim 15, wherein the wireless communication connection includes Bluetooth.

17. Apparatus comprising:
a computer system performing general computation processes;
an external device performing specialized computation processes, coupled to said computer system, and selectively exchanging data with said computer system;
a process request receiver within said computer system which receives process requests provided by said external device;
a frequency detector within said computer system which detects the frequency of process requests received by said process request receiver and generates a process request frequency signal; and
a power saving mode selector within said computer system which selects an appropriate power saving mode amongst a plurality of power saving modes according to the process request frequency signal;
wherein said computer system shifts from a normal mode to the power saving mode as selected by said power saving mode selector when a predetermined process condition is satisfied.

18. The apparatus according to claim 17 further comprising:
an operating-situation detector which detects an extant operating situation of the computer system;
wherein said power saving mode selector selects an appropriated power saving mode amongst a plurality power saving modes according to the process request frequency signal and the operating situation as detected by the operating situation detector.

19. The apparatus according to claim 18 wherein said computer system, upon receiving the process requests while operating in a power saving mode, returns to the normal mode and executes processes corresponding to the process requests.

20. The apparatus according to claim 19 wherein said power saving mode selector selects, on completion of execution of the requested processes, an appropriate power saving mode and the computer system is shifted to the selected power saving mode.

21. The apparatus according to claim 17, wherein the external device stores data in a local memory of the external device and requests to upload data to the computer system only when an amount of data stored in the local memory of the external device exceeds a predetermined value; wherein the frequency detector detects the frequency of process requests over a wireless communication connection; and the apparatus further comprising:
a usage situation detector within said computer system monitoring the operational state of said computer system including data exchange between said computer system and said external device; and
a power shift controller within said computer system coupled to said usage situation detector and said operating system program and responding to the monitored operational state of said computer system by shifting said computer system among power saving modes.

* * * * *

UNITED STATES PATENT AND TRADEMARK OFFICE
CERTIFICATE OF CORRECTION

| | |
|---|---|
| PATENT NO. | : 7,587,618 B2 |
| APPLICATION NO. | : 10/102352 |
| DATED | : September 8, 2009 |
| INVENTOR(S) | : Inui et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1885 days.

Signed and Sealed this

Twenty-first Day of September, 2010

David J. Kappos
*Director of the United States Patent and Trademark Office*